J. B. ODELL.
TELEGRAPH APPARATUS.
APPLICATION FILED DEC. 21, 1907.

980,118.

Patented Dec. 27, 1910.

Witnesses:

Inventor:
John B. Odell
by Peirce & Fisher
Attys.

J. B. ODELL.
TELEGRAPH APPARATUS.
APPLICATION FILED DEC. 21, 1907.

980,118.

Patented Dec. 27, 1910.
4 SHEETS—SHEET 2.

Witnesses:
Wm. P. Bond

Inventor:
John B. Odell
by Pierce & Fisher
Attys

J. B. ODELL.
TELEGRAPH APPARATUS.
APPLICATION FILED DEC. 21, 1907.

980,118.

Patented Dec. 27, 1910
4 SHEETS—SHEET 3.

J. B. ODELL.
TELEGRAPH APPARATUS.
APPLICATION FILED DEC. 21, 1907.

980,118.

Patented Dec. 27, 1910
4 SHEETS—SHEET 4.

Witnesses:

Inventor:
John B. Odell
by Pierce & Fisher
Attys.

UNITED STATES PATENT OFFICE.

JOHN B. ODELL, OF CHICAGO, ILLINOIS, ASSIGNOR OF ONE-HALF TO ARTHUR G. LEONARD, OF CHICAGO, ILLINOIS.

TELEGRAPH APPARATUS.

980,118. Specification of Letters Patent. Patented Dec. 27, 1910.

Application filed December 21, 1907. Serial No. 407,454.

*To all whom it may concern:*

Be it known that I, JOHN B. ODELL, a citizen of the United States, and a resident of Chicago, county of Cook, and State of Illinois, have invented certain new and useful Improvements in Telegraph Apparatus, of which the following is a specification.

The invention relates to telegraphic apparatus and more particularly to electric selective apparatus by which the several types of a printing mechanism or other devices at one station or a number of devices at different stations may be selectively controlled.

The invention seeks to provide an electric selective apparatus that is simple in construction and rapid and accurate in operation.

A further object of the invention is to provide an improved form of printing mechanism in connection with the electric selective apparatus.

With these and other objects in view the invention consists in the features of construction, combinations and arrangements of parts hereinafter set forth, illustrated in the accompanying drawings and more particularly pointed out in the appended claims.

Figure 1:
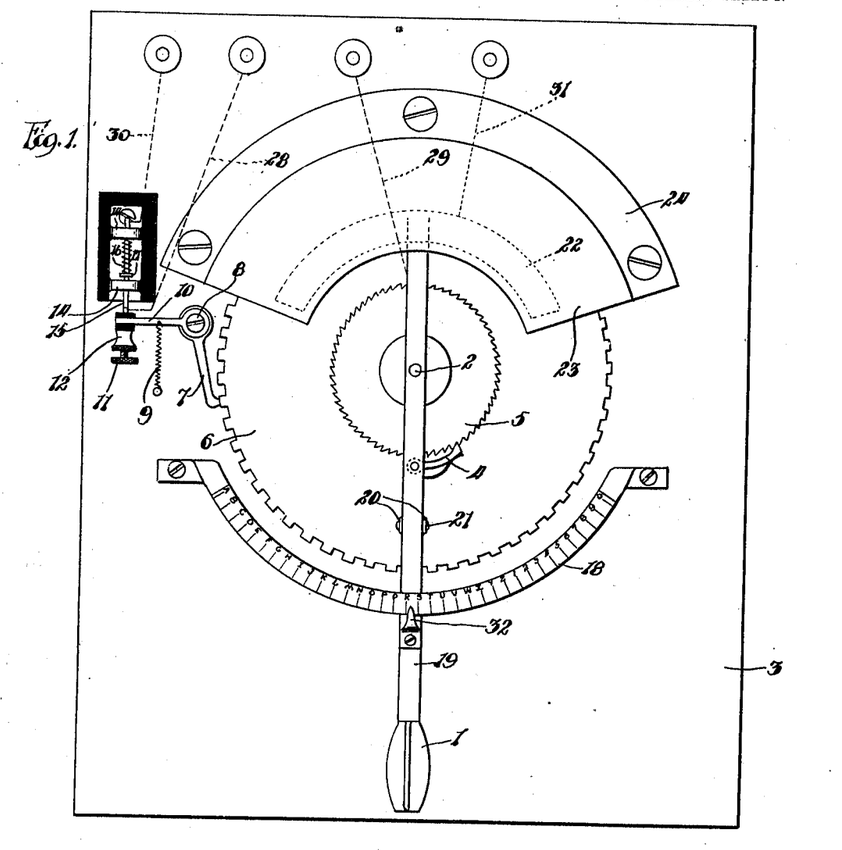
Figure 1 is a plan view of the transmitter employed.
Figure 2:
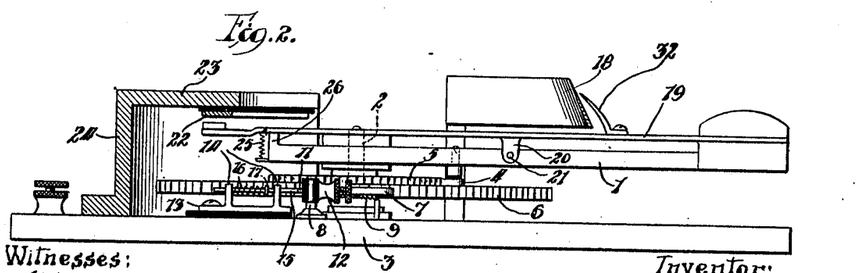
Fig. 2 is a side view thereof.

The transmitter is arranged to impart a series of selecting impulses, and an operating impulse to the line. The operation of the transmitter is controlled by means of a pivoted handle or lever 1 that is arranged to swing in horizontal direction on a vertical pin or stud 2 that is fixed to a base-plate 3. The handle or lever 1 is provided with a spring-held pawl 4 that is arranged to engage the teeth of a ratchet 5 loosely mounted upon the vertical pin or stud 2. The ratchet 5 is shifted by the pawl 4 when the lever 1 is moved in one direction or toward the right. When the hand-lever 1 is returned to the left-hand side of the apparatus pawl 4 moves idly over the teeth of the ratchet. A large toothed wheel 6 is fixed to the ratchet wheel 5 and is moved therewith. This wheel is arranged to operate a make-and-break device comprising a dog 7 which is mounted upon a vertical pivot pin 8 on the base-plate of the apparatus. A spring 9 connected to the tail-piece 10 of the dog holds the latter into engagement with the teeth of the wheel 6. A contact screw 11 is mounted upon the end of the tail-piece 10 but is insulated therefrom as shown. It is held in adjusted position upon the tail-piece of the dog by a lock-nut 12. An insulated bracket 13 on the base-plate is provided with a pair of upwardly projecting lugs 14 through which slide a plunger contact 15 which is arranged to coöperate with the contact screw 11 to make and break the line circuit as the dog 7 is shifted by the toothed wheel 6. A spring 16 coiled about the plunger contact 15 extends between one of the lugs 14 and a collar 17 on the contact piece and serves to hold the latter yieldingly in position with the collar 17 against the other lug 14 when the contact screw 11 is moved to open the circuit, as it does when the dog 7 enters the spaces between the teeth on the wheel 6.

A segmental scale 18 fixed to the base-plate 3 extends over the outer end of the operating lever or handle 1 and the divisions of the scale are marked as shown to indicate the characters to be transmitted. The divisions on the scale 18 are each equal to one-half the distance between the teeth on the wheel 6 so that when the arm 1 is moved from one division to the next on the scale a line circuit through the contacts 11 and 15 will be either opened or closed. The selecting apparatus, as will presently appear, is arranged to operate both on the opening and closing of the line circuit.

A switch arm 19 extends longitudinally over the operating arm 1 and is arranged to swing horizontally therewith. It is provided intermediate its ends with a pair of depending lugs 20 connected to the operating arm 1 by a transverse pivot pin 21 so that in any position of the operating lever 1 the switch arm 19 may be shifted to bring its rear end into engagement with a segmental contact plate 22 that is fixed to the underside of a flange 23. This flange is shown held upon a segmental bracket 24 that is fixed to the base-plate 3. A spring 25 extends between the inner ends of the switch arm 19 and the operating lever 1 and normally holds the switch arm into engagement with a lug 26 on the lever and out of engagement with the contact plate 22.

Figure 4:
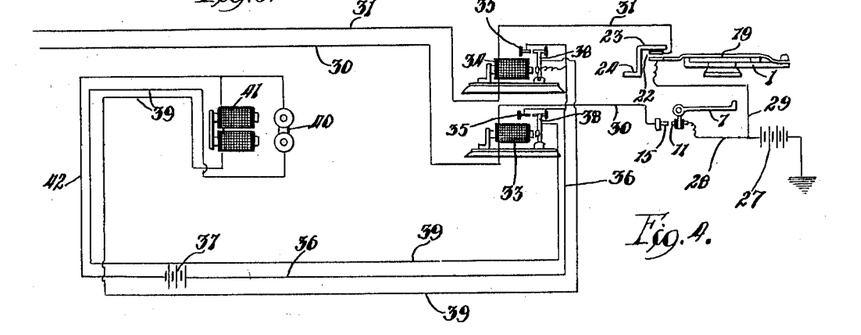
Fig. 4 is a diagram of the operating circuits.

As illustrated in the diagrammatic Fig. 4 the line battery 27 is connected on one side to ground and on the other side by the conductors 28 and 29 to the contact 11 and switch arm 19. Two line wires 30 and 31 are connected respectively to the contact 15 and contact plate 22. To send any given signal the operating lever 1 and switch arm 19 are moved back to the left to the limit of its movement in this direction which is determined by the end of the segmental scale 18. During this movement the pawl 4 passes idly over the teeth of the ratchet 5 and the latter and the toothed wheel 6 remain stationary. The lever 1 and switch 19 are then moved to the right until a pointer 32, that is fixed to the switch arm 19 adjacent the scale 18, is opposite the character to be transmitted. This movement shifts the ratchet wheel 5 and toothed wheel 6 so that dog 7 is shifted to open and close the circuit through the line wire 30 a certain number of times. The number of times that the line circuit is thus opened and closed varies, of course, with the different characters. When the operating lever 1 is moved to the right for the proper distance, the outer end of the switch arm 19 is depressed and its inner end is brought into engagement with the contact plate 22 so that an operating impulse is transmitted from the line battery over the line wire 31. At the receiving station line wires 30 and 31 extend through the coils of a pair of relays 33 and 34. The contacts 35 of these relays are connected by a conductor 36 to a local battery 37. The armatures 38 of the relays are connected respectively by conductors 39 and 40 to a pair of magnets 40 and 41. One pole of each of these magnets is grounded or connected to the local battery 37 by a return wire 42. The selecting impulses, which vary in number in accordance with the characters to be transmitted, thus operate the relay 33 at the receiving station and the magnet 40 while the operating impulse transmitted over the line wire 31 operates the magnet 41 through the medium of the relay 34. It is obvious that the magnets 40 and 41 could if desired, be imposed directly in the line wires 30 and 31 but, for obvious reasons, it is preferable to arrange these magnets in local circuit which are controlled by the line relays. The shifting or selecting magnet 40 at the receiving station is arranged to variably shift a suitable step-by-step device and the operating magnet 41 is arranged to complete the operation of the signal thus selected. In the form of the invention illustrated, these magnets are arranged to control the operation of a series of type preferably arranged upon a type-wheel.

Figure 3:
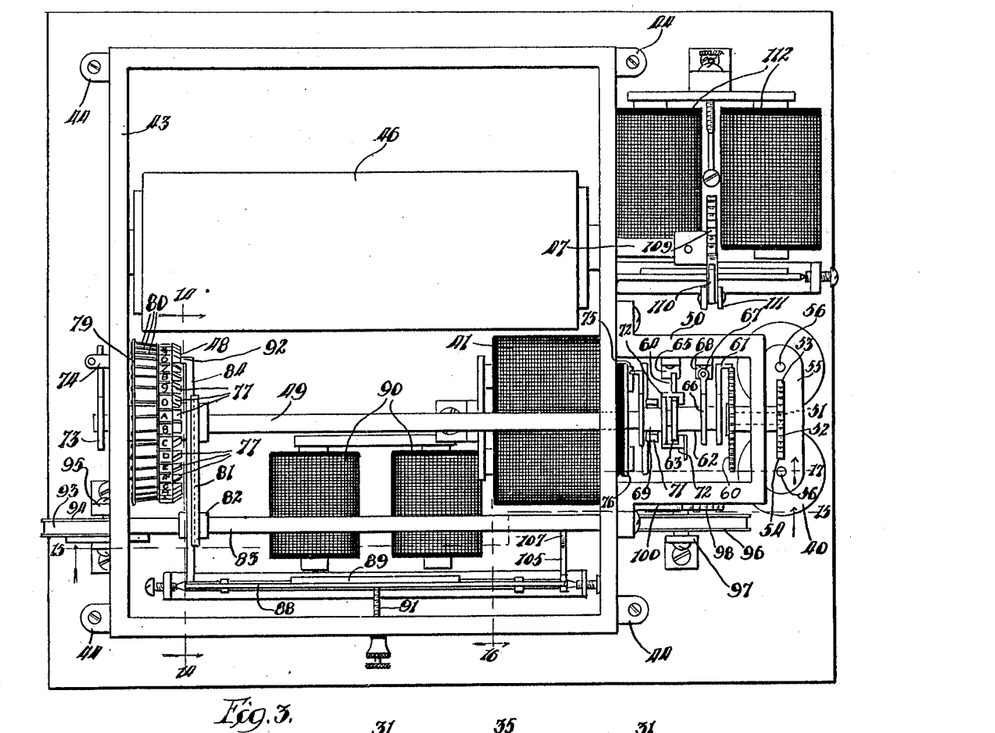
Fig. 3 is a plan view of the improved selecting apparatus and printing mechanism.
Figure 5:
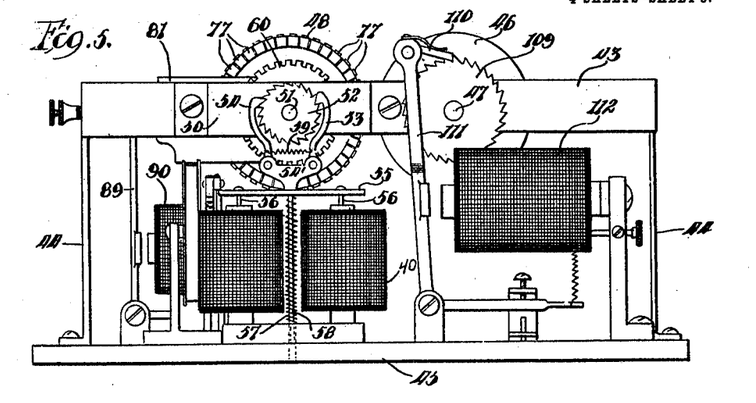
Fig. 5 is an end view of the parts shown in Fig. 3.
Figure 6:
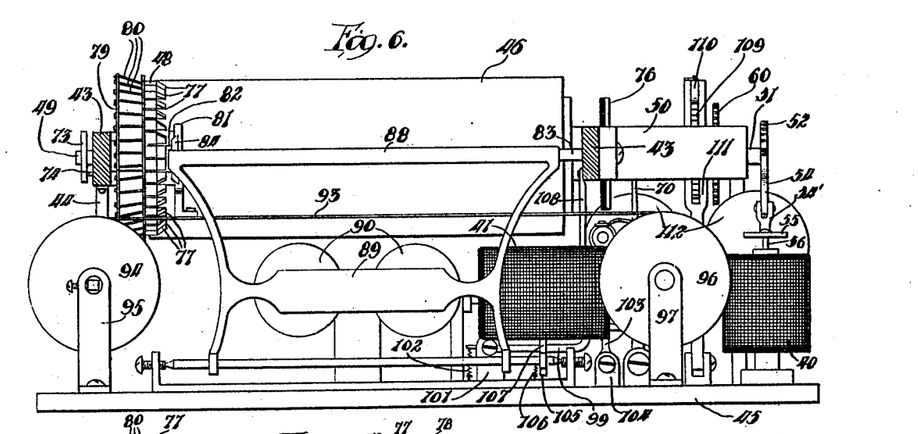
Fig. 6 is a front view thereof with the supporting frame shown in section.

The receiving apparatus comprises a suitable rectangular frame 43 mounted on corner posts 44 that are fixed at their lower ends to a suitable base-plate 45. A cylindrical platen 46, for supporting the paper upon which the characters are printed, is mounted upon a shaft 47 and this shaft is journaled between the side-bars of the frame 43. The platen may be provided with any suitable means for holding the paper in position thereon. The type-wheel 48 is mounted in front of the platen 46 upon a shaft 49 that is journaled in the side-bars of the frame 43. This shaft is preferably flattened on one side and the hub of the type-wheel is provided with a correspondingly shaped opening so that the type-wheel will rotate with the shaft but is free to slide laterally thereon. One end of the shaft 49 projects beyond one of the side-bars of the frame 43 and is surrounded by a U-shaped bracket 50 which is secured to the side-bar of the frame. The bracket 50 supports a step-by-step device which is operated by the selecting magnet 40 to variably shift the type-wheel 48. This step-by-step device comprises a short shaft 51 journaled in the bracket 50 and arranged in line with the shaft 49. On its outer end it is provided with a ratchet-wheel 52 which, as shown in Fig. 5, is arranged to be engaged by a pair of pawls 53 and 54. These pawls are pivoted upon a support 54' that is fixed to the armature 55 of the shifting or selecting magnet 40. This armature is guided to move in vertical direction upon a pair of pins 56 fixed to the poles of the magnet 40 and a spring 57 coiled about a pin 58 centrally fixed to the armature normally upholds it in raised position. The lower end of the pin 58 is guided in an opening at the base of the magnet 40. The upper face of the tooth of the pawl 53 is inclined and its lower face is abrupt while the upper face of the tooth of the pawl 54 is abrupt and its lower face is inclined. The pawls are yieldingly held into engagement with the ratchet wheel 52 by a spring 59 which extends between them. These pawls thus act in opposite directions. That is to say, when the armature 55 is attracted by the magnet 40, the pawl 53 operates to turn the ratchet wheel 52 one step while the pawl 54 passes idly over the teeth of the ratchet and, when the magnet 40 is deënergized and armature 55 returns to normal position, the pawl 54 acts to advance the ratchet wheel 52 one step. That is to say, pawl 53 is a pull pawl while pawl 54 is a push pawl and they act alternately as operating and holding pawls to advance the ratchet wheel 52 one step both when the armature 55 is attracted by the magnet 40 and when it is restored to normal position by the spring 58. The selecting apparatus thus advances when the armature of the magnet 40 is vibrated in one or the other direction; or in other words, either when the line circuit is made or when it is broken. This arrangement materially increases the speed of a step-by-step selective device.

Figures 7, 8, 9, 10, 11, 12, 13:
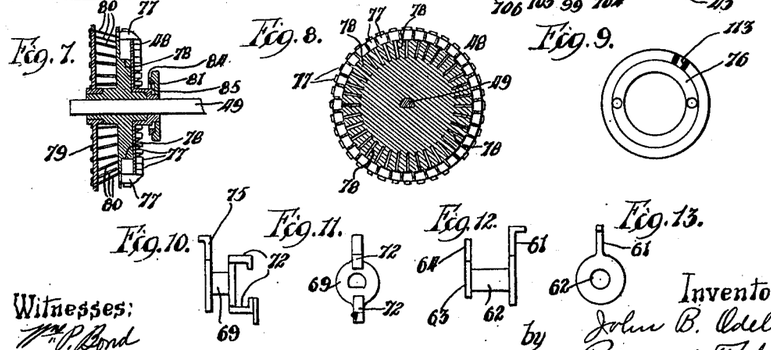
Figs. 7 and 8 are detail sections of the type-wheel.
Fig. 9 is a detail view of the contact device which is arranged upon the shaft of the type-wheel.
Figs. 10 and 11 are detail views of a coupling device.
Figs. 12 and 13 are detail views of the connector.
Figures 16, 17, 18:
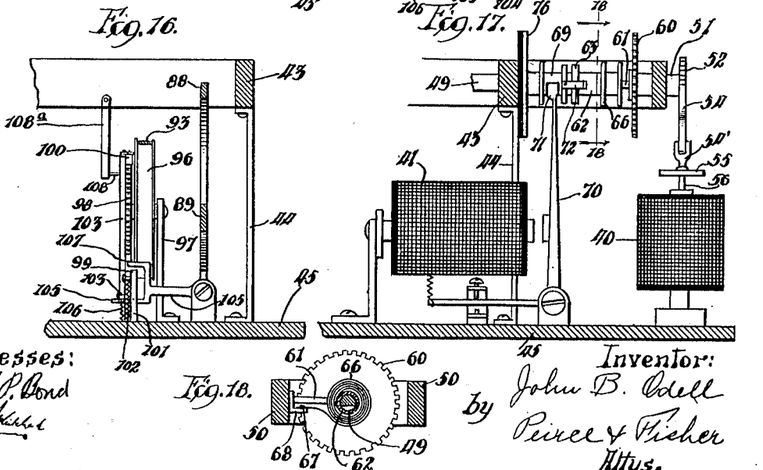
Fig. 16 is a detail section on line 16—16 of Fig. 3.
Fig. 17 is a detail section on line 17—17 of Fig. 3.
Fig. 18 is a detail section on line 18—18 of Fig. 17.

A toothed wheel 60 (see Figs. 3, 5 and 17) is fixed to the inner end of the short shaft 51 and is normally engaged by a lug or finger 61 on the outer end of a connector sleeve 62. This connector sleeve is shown in Figs. 12 and 13 and is loosely mounted on the shaft 49 to slide laterally and rotate thereon. At its inner end it is provided with a flange 63 having a projecting lug or arm 64 arranged to engage a stop 65 projecting from the side of the bracket 50. A light spring 66 coiled about the connector sleeve 62 is connected thereto at one end and at its other end is connected by a vertical pivot pin 67 to a lug 68 on the side of the bracket 50. This spring is placed under tension as the connector sleeve 62 is moved with the toothed wheel 60 of the step-by-step device and acts to restore the connector sleeve to normal position with the lug 64 in engagement with the stop 65 when the connector sleeve is shifted to disengage the finger 61 from the toothed wheel 60 of the step-by-step device. A coupling sleeve 69 is also mounted upon the shaft 49 adjacent the connector sleeve 62 and this sleeve may also be shifted laterally upon the shaft. The opening of the sleeve (see Fig. 11) is shaped to fit the shaft, however, so that the coupling sleeve 69 rotates with the shaft. The armature 70 (see Fig. 17) of the operating magnet 41 is provided with a forked upper end 71 that engages a groove in the coupling sleeve 69, so that the latter is shifted upon the shaft 49 when the armature 70 is moved by the magnet 41. The coupling sleeve is provided at its outer end with a pair of bent fingers 72 that embrace the flange 63 on the connector sleeve 62 so that the latter is shifted inwardly, when the operating magnet 41 is energized, and its finger 61 is thereby shifted out of engagement with the toothed wheel 60 of the step-by-step device. Then the spring 66 may at once restore the connector sleeve 62 to normal position with the lug 64 thereon against the stop 65. When the operating magnet 40 is then deënergized the connector and coupling sleeves 62 and 69 are moved outwardly and the finger 61 reengages the toothed wheel 60 of the step-by-step device and the apparatus is ready to effect the succeeding selection.

The type-wheel shaft 49 is provided on its left-hand end with a light coiled spring 73 which is similar to the spring 66 and is connected to the shaft 49 at one end and to a lug 74 on the side-bar of the frame at its other end. This spring serves to restore the type-wheel 48 and shaft 49 after a signal is completed and normally holds one of the arms or fingers 72 of the coupling sleeve 69 in engagement with the lug 64 of the connector sleeve 62. When the connector sleeve is advanced from its normal position by the operation of the step-by-step device the engagement between the arm 64 thereon and the arm 72 on the coupling sleeve 69 advances the shaft 49 and the type-wheel 48. The extent of this movement, of course, varies in accordance with the number of times the line circuit is opened and closed and in accordance with the particular character transmitted to bring the corresponding type on the type-wheel opposite the printing point. The operating impulse is then transmitted, as described, over the line and the magnet 41 is energized to shift the connector and coupling sleeves 62 and 69. The finger 61 of the connector sleeve is, as stated, thereby withdrawn from the toothed wheel 60 of the step-by-step device and is at once restored to normal position by the spring 66. The one-way engagement between the connector sleeve 62 and the coupling sleeve 63 (which is arranged so that it must rotate with the shaft 49 and type-wheel 48 thereon) permits the loose connector sleeve 62 to return to normal independently of the type-wheel and the parts connected to rotate therewith. When the operating magnet 41 is energized the type-wheel is momentarily held in its shifted position and until the signal is completed by a contact arm 75 which is brought snugly into engagement with a circular contact-plate 76, as the sleeve 69 is shifted by the armature 70 of the operating magnet 41. The circular contact-plate 76 is arranged about the shaft 49 and is fixed to but is insulated from the side-bar of the frame 43. The friction between the contact piece or arm 75 and the contact-plate 76 is sufficient to hold the shaft 49 and type-wheel 48 in shifted position against the tension of the spring 73 and these contacts also serve to close the circuit through the printer magnet which completes the operation of the selected signal. When the operating magnet is deënergized and its armature 70 restored, the coupling and connector sleeves 69 and 62 are moved outwardly along the shaft 49 to bring the finger 61 of the connector sleeve into reëngagement with the toothed wheel 60 of the step-by-step device and the spring 73 then returns the type-wheel and type-wheel shaft until the arm 72 on the coupling sleeve 69 strikes the lug 64 on the connector sleeve 62. The apparatus is then ready to receive the next succeeding signal. Indeed, it is ready as soon as the operating magnet is deënergized, since the connector 62 is at once shifted into engagement with the step-by-step device and its forward movement, effected by the step-by-step device, will properly position the type-wheel even though the latter has not returned fully to initial position before the selecting magnet 40 commences its operation.

Any suitable form of printing mechanism may be employed and indeed the selecting apparatus described, as is obvious, could be used to effect the selective operation of devices other than a printing mechanism. It is particularly adapted, however, for controlling the operation of the improved mechanism illustrated.

Figure 14:
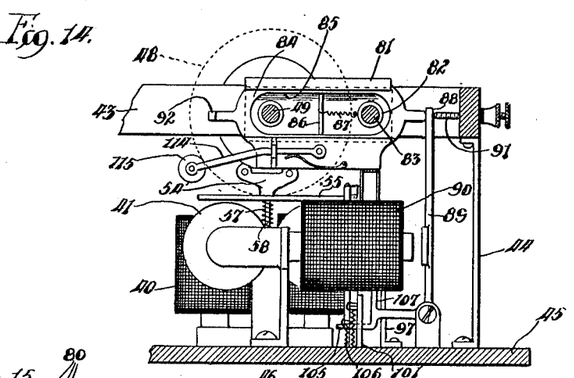
Figs. 14 and 15 are detail views with parts shown in section on the lines 14—14 and 15—15 of Fig. 3.
Figure 15:
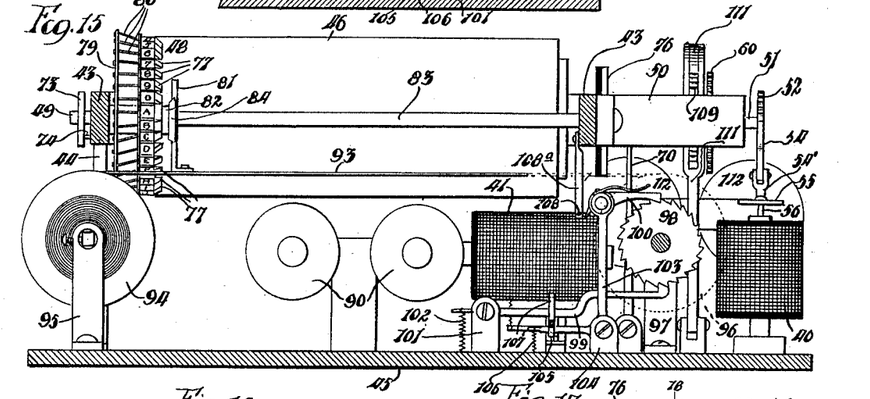

The type 77 are mounted in suitable grooves or seats 78 (see Figs. 7 and 8) in the type-wheel to shift radially thereon. A disk 79 fixed to the hub of the type-wheel is provided with a series of springs 80 which normally hold the type 77 inwardly or toward the axis of the type-wheel. Means are provided for forcing the selected type outwardly to effect the impression thereof upon the paper carried by the cylindrical platen 46. For this purpose a bracket 81 is fixed at one end to the hub of the type-wheel and at its outer end is provided with a hub 82 engaging a guide-rod 83 that extends between the side-bars of the main frame parallel with the type-wheel shaft 49. The bracket 81 is thus free to slide laterally with the type-wheel and it carries in a suitable guide-way formed therein, a longitudinally reciprocating printing device or plunger 84. This plunger (see Fig. 14) is provided with an elongated opening 85 through which the type-wheel shaft 49 and guide-rod 83 extend. A spring 87 fixed at one end to a pin 86 on the sliding plunger 84 and at its other end to the hub or guiding sleeve 82 of the bracket normally holds the plunger outwardly and into engagement with an operating bar 88 that forms the upper portion of the vibrating armature 89 of a printing magnet 90. The armature is normally spring-held in position with the bar 88 at its upper portion held against a stop-screw 91 that extends through the front bar of the frame 43. The circuit through the printing magnet 90 is arranged to be closed by the contacts 75 and 76 so that the plunger 84 is shifted when the operating impulse is transmitted over the line and the selected type, which has been brought to the printing point and which is momentarily held in such position by the friction between the contact arm 75 and contact-plate 76, is forced outwardly in radial direction against the tension of its spring 80 by the lug or projection 92 on the end of the printing plunger 84 to effect the impression of the selected type upon the paper. The step-by-step movement of the printing wheel and plunger along the shaft 49 is also effected by the operation of the printing magnet 90. For this purpose the slide or bracket 81 which is connected to the hub of the type-wheel is connected to a steel tape 93 that is wound at its left-hand end about a spring drum 94 journaled in a bracket 95. At its opposite end the tape 93 is wound about a drum 96 journaled in a bracket 97. This drum is provided with a ratchet wheel 98 that is engaged by a holding pawl 99 and an operating pawl 100. The holding pawl is pivoted to a lug 101 fixed to the base plate 45 and is held in position by a spring 102. The operating pawl 100 is pivoted upon the upper end of an L-shaped operating arm 103 that is pivoted to a lug 104 on the base-plate. The operating pawl is normally held in position by an arm 105 that is fixed to the pivot shaft of the armature 89 of the printer-actuating magnet 90. When this magnet is energized, the arm 105 will be lowered and a spring 106 connected to the pawl operating lever 103 will shift the operating pawl 100 backwardly into engagement with the next tooth so that, when the printer magnet 90 is deënergized, the arm 105 on the armature thereof will force the operating pawl 100 to advance the ratchet wheel 98 and drum 97 and thus move the printing wheel laterally along the shaft one step. This also, of course, winds up the spring of the drum 94. The type-wheel is provided with one blank space, that is to say, with a space in which there is no type. When the type-wheel has reached its extreme movement toward the right, the proper signal is transmitted to bring this blank space opposite the printing point. The printing plunger 84, then, in its forward movement, enters the blank space on the edge of the type-wheel and permits of an abnormally large movement of the armature of the printing-magnet 90. This excessive movement of the armature 89 will bring a projection 107 on the arm 105 into engagement with the holding pawl 99 to disengage it from the ratchet 98. At the same time the excessive backward movement of the operating pawl 100 permitted by the excessive shift of the arm 105 will bring the tail of the arm 100 against a stop pin 108 so that it is also shifted out of engagement with the ratchet wheel 98. The spring drum 94 of course then operates to quickly return the printing wheel and printing plunger to initial position. The pin 108 is fixed to a lug 108ª depending from the side-bar of the frame 43. It should be noted that the portion 88 of the armature 89 is of sufficient length to properly operate the printing plunger 84 in any one of its shifted positions.

To rotate the platen 46 step by step to effect the proper line spacing, the end of this shaft, as shown in Figs. 3 and 5, is provided with a ratchet wheel 109. This wheel is operated by a pawl 110 mounted upon the upper end of an armature lever 111. The armature lever is operated by a magnet 112 which is closed when a special signal is transmitted over the line and the contact arm 75 is brought opposite an insulated contact 113 (see Fig. 9) of the face of the contact plate 76. In all other positions to which the switch arm 75 is moved the circuit through the printer magnet 90 is closed. But, as stated, the special signal will bring the arm opposite the contact 113 so as to close the circuit through the line space magnet 112.

To ink the type-wheel the sliding bracket 81 is provided with a spring-held arm 114 having an inking roller 115 on its end that serves to ink the type of the type-wheel as it is rotated.

It is obvious that the circuits for controlling the selecting and operating magnets 40 and 41 from a distant station may be modified and other changes made in the details set forth without departure from the essentials of the invention as defined in the claims. It is also obvious that parts of the invention may be taken without its adoption in entirety.

Having described my invention, what I claim as new and desire to secure by Letters Patent, is:—

1. In an electric selective apparatus, the combination with a member to be variably shifted, said member being spring-held in normal position, of a ratchet wheel, a shiftable connector between said ratchet wheel and said member, a selecting magnet, a spring-held armature vibrated by said magnet, a push pawl and a pull pawl pivoted to said armature and engaging the teeth of said ratchet wheel, to shift said ratchet wheel and said member one step when said armature is shifted in either direction, and means for shifting said connector to permit the return of said member to normal position, substantially as described.

2. In an electric selective apparatus, the combination with a member to be variably shifted, of a single selecting magnet, a non-pivoted spring-held armature vibrated by said magnet, a ratchet wheel connected to said member, a push pawl and a pull pawl pivoted directly on said armature and engaging the teeth on opposite sides of said ratchet wheel, to advance said ratchet wheel and said member one step when said armature is shifted in either direction, and a common spring connecting said pawls and pressing the same into engagement with said ratchet wheel, substantially as described.

3. In an electric selective apparatus, the combination with a spring-held part variably shiftable from normal position, of a selecting magnet, an armature vibrated by said magnet, pawl and ratchet mechanism controlled by the movement of said armature for variably shifting said part, a toothed member connected to said pawl and ratchet mechanism, a shiftable connector normally engaging said toothed member and connecting said variably operable part thereto and means for shifting said connector out of engagement with said toothed member to permit the return of said part by its spring to normal position and for returning said connector into engagement with said toothed member for the succeeding operation.

4. In an electric selective apparatus, the combination with a part variably operable from normal position, of a step-by-step device for variably shifting said part, a connector between said step-by-step device and said part, and means for shifting said connector into and out of engagement with said step-by-step device, said connector having a one-way engagement with said part whereby the latter and said connector may return to normal independently of each other.

5. In an electric selective apparatus, the combination with a spring-held part variably operable from normal position against the tension of said spring, of an electrically operated step-by-step device for variably shifting said part, a connector between said step-by-step device and said part, and means for shifting said connector out of and into engagement with said step-by-step device, said connector being spring-held in normal position and having a one-way engagement with said variably operable part, whereby said part and said connector may be returned to normal position independently of each other.

6. In telegraphs, the combination with a transmitter arranged to transmit a series of selecting impulses and an operating impulse, of a signal-maker at the receiving station spring-held in normal position, an electrically operated step-by-step device controlled by the selecting impulses for variably shifting said signal-maker from normal position against the tension of its spring, a connector between said step-by-step device and said signal-maker, and means controlled by the operating impulse for shifting said connector to permit the return of said signal-maker by its spring to normal position without moving said step-by-step device, and for returning said connector into engagement with said step-by-step device for the succeeding operation, substantially as described.

7. In telegraphs, the combination with a spring-held signal-maker variably operable from normal position, of an electrically operated step-by-step device for variably shifting said signal-maker, a connector interposed between said step-by-step device and said signal-maker, and means for shifting said connector out of engagement with said step-by-step device to permit the return of said signal-maker by its spring to normal position and for returning said connector into engagement with said step-by-step device for the succeeding signal.

8. In telegraphs, the combination with a signal-maker variably shiftable from normal position, of an electrically operated step-by-step device for variably shifting said signal-maker, a connector interposed between said step-by-step device and said signal-maker, means for shifting said connector out of and into engagement with said step-by-step device, said connector having a one-way engagement with said signal-maker, and means for returning said connector and said signal-maker independently to normal position when said connector is disengaged from said step-by-step device.

9. In telegraphs, the combination with a signal-maker variably shiftable from normal position, of an operating magnet, a step-by-step device actuated by said magnet for variably shifting said signal-maker, a connector normally engaging said step-by-step device and having a one-way engagement with said signal-maker, means for disengaging said connector from said step-by-step device and separate springs for returning said connector and said signal-maker independently to normal position.

10. In telegraphs, the combination with a signal-maker variably shiftable from normal position, of an electrically operated step-by-step device for variably shifting said signal-maker, and means for disconnecting said signal-maker from said step-by-step device to permit the return of the signal-maker to normal position independently of said step-by-step device, said disengaging means being arranged to momentarily hold said signal-maker in shifted position until the signal is completed.

11. In telegraphs, the combination with a signal-maker variably shiftable from normal position, of an operating magnet, an armature vibrated by said magnet, a step-by-step device controlled by the movement of said armature for variably shifting said signal-maker, a connector interposed between said step-by-step device and said signal-maker, and means for disengaging said connector from said step-by-step device and for momentarily holding said signal-maker in shifted position until the signal is completed.

12. In telegraphs, the combination with a signal-maker variably operable from normal position, of an electrically operated step-by-step device for variably shifting said signal-maker, a connector engaging said step-by-step device and having a one-way engagement with said signal-maker, means for shifting said connector out of engagement with said step-by-step device and for momentarily holding said signal-maker in position, means for returning said connector to normal position as soon as it is so shifted, and means for returning said signal-maker to normal position after the signal is completed.

13. In telegraphs the combination with a signal-maker variably shiftable from normal position, of an operating magnet, an armature vibrated by said magnet, a step-by-step device controlled by said armature for variably shifting said signal-maker, a connector normally engaging said step-by-step device and having a one-way engagement with said signal-maker, means for shifting said connector out of and into engagement with said step-by-step device and for momentarily holding said signal-maker in shifted position, a spring for returning said connector to normal position as soon as it is disengaged from said step-by-step device and a second spring for restoring said signal-maker to normal position after the signal is completed.

14. In telegraphs, the combination with a transmitter for imparting a series of selecting impulses and an operating impulse to the line, of a signal-maker at the receiving station, means at the receiving station controlled by the selecting impulses for variably shifting said signal-maker, and means controlled by the operating impulse to disconnect the signal-maker from said shifting means to permit its return to normal position independent of said shifting means, said disconnecting means being arranged to hold the signal-maker momentarily in shifted position and to complete the signal.

15. In telegraphs, the combination with a transmitter arranged to impart a series of selecting impulses and an operating impulse to the line, of a spring-held signal-maker at the receiving station, a step-by-step device controlled by the selecting impulses for variably shifting said signal-maker from normal position, and means controlled by the operating impulse for disconnecting said signal-maker from said step-by-step device to permit the return of its signal-maker by its spring to normal position independently of said step-by-step device, said means being arranged to momentarily hold the signal-maker in shifted position and to complete the operation thereof.

16. In telegraphs, the combination with a transmitter arranged to impart a series of selective impulses and an operating impulse to the line, of a signal-maker at the receiving station variably operable from normal position, a shifting magnet controlled by the selecting impulses, a step-by-step device controlled by said shifting magnet for variably moving the signal-maker from normal position, an operating magnet energized by the operating impulse, means controlled by said operating magnet for disengaging said signal-maker from said step-by-step device, and means controlled by said operating-magnet for momentarily holding said signal-maker in shifted position and for completing the signal.

17. In telegraphs, the combination with a signal-maker variably shiftable from normal position, of a shifting magnet, a step-by-step device controlled by said shifting magnet for variably moving said signal-maker from normal position, a connector between said step-by-step device and signal-maker, an operating magnet, means controlled by said operating magnet for shifting said connector to permit the return of said signal-maker to normal position, and means controlled by said operating magnet for momentarily holding said signal-maker in shifted position and for completing the operation thereof.

18. In telegraphs, the combination with a signal-maker variably shiftable from normal position, of a shifting magnet, a step-by-step device controlled by said shifting magnet for variably moving said signal-maker, a connector normally engaging said step-by-step device and having a one-way engagement with said signal-maker, an operating magnet, means controlled by said operating magnet for shifting said connector out of and into engagement with said step-by-step device to permit the return of said signal-maker to normal position, a spring for returning said connector to normal position as soon as it is disengaged from said step-by-step device, means controlled by said operating magnet for momentarily holding said signal-maker in shifted position and for completing the operation thereof, and a spring for returning said signal-maker to normal position when the signal is completed.

19. In printing telegraphs, the combination with a transmitter arranged to transmit a series of selecting impulses and an operating impulse, of a type-wheel at the receiving station, a spring for holding said type-wheel in normal position, a selecting magnet acting in response to the selecting impulses, a pawl and ratchet mechanism operated by said selecting magnet and normally connected to said type-wheel to advance the same against the tension of said spring, an operating magnet acting in response to the operating impulse, an impression device controlled by said operating magnet, and means controlled by said operating magnet for disengaging said type-wheel from said step-by-step device, to permit said spring to restore said type-wheel to normal position, substantially as described.

20. In printing telegraphs, the combination with a rotary type-wheel, of a shifting magnet therefor, a step-by-step device controlled by said shifting magnet for variably moving said type-wheel from normal position, an operating magnet, means controlled by said operating magnet for disconnecting said type-wheel from said step-by-step device to permit the return of the type-wheel to normal position, and means controlled by said operating magnet for momentarily holding the type-wheel in shifted position and for completing the operation of the selected type.

21. In printing telegraphs, the combination with a rotary type-wheel, of a shifting magnet, a step-by-step device controlled by the shifting magnet for variably moving the type-wheel from normal position, a connector interposed between said step-by-step device and said type-wheel, and operating magnet, means controlled by said operating magnet for shifting said connector to permit the return thereof and of said type-wheel to normal position, and means controlled by said operating magnet for momentarily holding the type-wheel in shifted position and for completing the operation of the selected type.

22. In printing telegraphs, the combination with a rotary type-wheel, of a shifting magnet, a step-by-step device controlled by said shifting magnet for variably moving said type-wheel from normal position, a connector normally engaging said step-by-step device and having a one-way engagement with said type-wheel, an operating magnet, means controlled by said operating magnet for disengaging said connector from said step-by-step device, a spring for returning said connector to normal position when so disengaged, means controlled by said operating magnet for momentarily holding said type-wheel in shifted position and for completing the operation of the selected type, and a spring for returning said type-wheel to normal position after the operation thereof.

23. In printing telegraphs, the combination with a rotary type-wheel variably shiftable from normal position, of a shifting magnet, a step-by-step device operated by said shifting magnet for variably moving said type-wheel, a connector interposed between said step-by-step device and said type-wheel, an operating magnet, means controlled by said operating magnet for disengaging said connector to permit the return of the connector and type-wheel to normal position, a printing magnet, means controlled thereby for effecting the printing of the selected type, and means controlled by said operating magnet for holding the type-wheel momentarily in shifted position and for closing the circuit through said printing magnet.

24. In printing telegraphs, the combination with a rotary type-wheel, of a shifting magnet, a step-by-step device controlled by the armature of said shifting magnet for variably moving said type-wheel from normal position, a connector normally engaging said step-by-step device and having a one-way engagement with said type-wheel, an operating magnet, means controlled by said operating magnet for disengaging said connector from said step-by-step device, a spring for returning said connector to normal position as soon as it is so disengaged, a printing magnet, means operated thereby for effecting the impression of the selected type, and a contact device controlled by said operating magnet and arranged to momentarily hold the type-wheel in shifted position and to close the circuit through said printing magnet.

25. The combination with a type-wheel of a rotating shaft whereon said type-wheel is slidably mounted, a shifting magnet, a step-by-step device controlled by said shifting magnet for variably rotating said shaft and type-wheel an operating magnet, means controlled by said operating magnet for disconnecting said shaft and type-wheel from said step-by-step device to permit the return thereof to normal position, a printer for effecting the impression of the selected type, and means controlled by said operating magnet for effecting the operation of said printer and for shifting said type-wheel along said shaft.

26. In printing telegraphs, the combination with a rotary type-wheel, a rotating shaft whereon said type-wheel is slidably mounted, a shifting magnet, a step-by-step device operated by said shifting magnet for variably moving said shaft and type-wheel from normal position, an operating magnet, means controlled by said operating magnet for disconnecting said type-wheel from said step-by-step device to permit the return of the type-wheel to normal position, a printer for effecting the impression of the selected type, a magnet for actuating said printer, means controlled by said operating magnet for momentarily holding said type-wheel in shifted position and for closing the circuit through said printer magnet, and means controlled by said printer magnet for advancing said type-wheel step by step along said shaft.

27. In printing telegraphs, the combination with a type-wheel, of a rotary shaft whereon said type-wheel is slidably mounted, a shifting magnet, a step-by-step device operated by said shifting magnet for variably moving said shaft and said type-wheel from normal position, a connector normally engaging said step-by-step device and having a one-way engagement with said shaft, an operating magnet, means controlled by said operating magnet for disengaging said connector from said step-by-step device to release the type-wheel therefrom, a spring for returning said connector to normal position when so disengaged, a printer for effecting the impression of the selected type, an actuating magnet for said printer, a contact device controlled by said operating magnet for momentarily holding the type-wheel in shifted position and for closing the circuit through said printer actuating magnet, and means controlled by said printer actuating magnet for feeding said type-wheel and said printer step by step along said shaft.

28. In printing telegraphs, the combination with a type-wheel, of a rotary shaft whereon said type-wheel is slidably mounted, a step-by-step device for variably rotating said shaft and type-wheel, a printer for effecting the impression of the selected type, a printer-actuating magnet, a spring-drum connected to said type-wheel and said printer, a pawl and ratchet controlled by said printer magnet for feeding said type-wheel and said printer step by step along said shaft against the tension of said spring-drum, and means operated by the armature of said printing magnet for disengaging said pawl and ratchet when the type-wheel is turned to a blank position whereby the type-wheel and printer may be returned along said shaft to initial position by the operation of said spring-drum.

29. In printing telegraphs, the combination with a paper cylinder and with a type-wheel, of a rotary shaft whereon said type-wheel is slidably mounted, a shifting magnet arranged to variably rotate said shaft and said type-wheel, a printer for effecting the impression of the selected type, an actuating magnet therefor, a contact device mounted on and rotating with said shaft for closing the circuit through said printer magnet, line space mechanism for said paper cylinder, and an operating magnet therefor, said rotary contact device being arranged to close the circuit through said line space magnet when turned to a predetermined position.

30. In printing telegraphs, the combination with a paper platen and with a rotary and laterally shiftable type-wheel having a series of radially shiftable type, of means for variably rotating said type-wheel, a printing plunger laterally shiftable therewith for effecting the impression of the selected type, a magnet arranged to operate said printing plunger in any one of its different positions, means controlled by said magnet for effecting the lateral step-by-step feed of said type-wheel and said printing plunger, and means for closing the circuit through said printer actuating magnet.

JOHN B. ODELL.

Witnesses:
   CLARA A. NORTON,
   KATHARINE GERLACH.